A. E. BLOCK.
ARCH SUPPORT.
APPLICATION FILED DEC. 14, 1911.
1,110,476.
Patented Sept. 15, 1914.
5 SHEETS—SHEET 1.
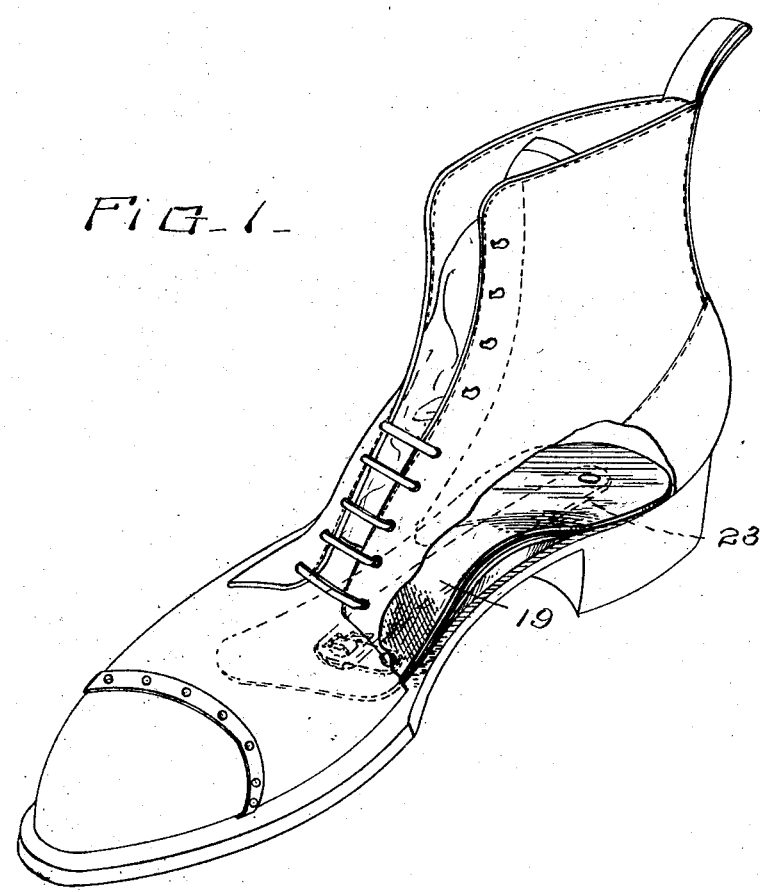
Fig. 1.
Fig. 17.
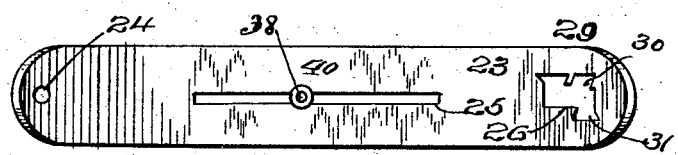
Inventor
Alexander E. Block.
Witnesses
By James L. Hopkins
Attorney

A. E. BLOCK.
ARCH SUPPORT.
APPLICATION FILED DEC. 14, 1911.

1,110,476.

Patented Sept. 15, 1914.
5 SHEETS—SHEET 2.

Witnesses
R. S. Trogner.
J. M. Fowler, Jr.

Inventor
Alexander E. Block.
By James K. Hopkins
Attorney

A. E. BLOCK.
ARCH SUPPORT.
APPLICATION FILED DEC. 14, 1911.

1,110,476.

Patented Sept. 15, 1914.
5 SHEETS—SHEET 3.

Inventor
Alexander E. Block.

Witnesses
R.S. Trogner.
J.M. Fowler Jr.

By James L. Hopkins
Attorney

A. E. BLOCK.
ARCH SUPPORT.
APPLICATION FILED DEC. 14, 1911.

1,110,476. Patented Sept. 15, 1914.
5 SHEETS—SHEET 4.

Witnesses
R. S. Trogner
J. M. Fowler Jr.

Inventor
Alexander E. Block.
By James L. Hopkins
Attorney

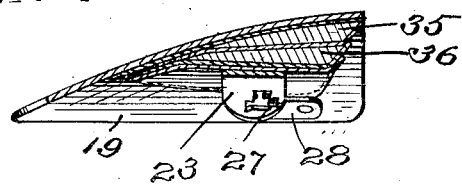
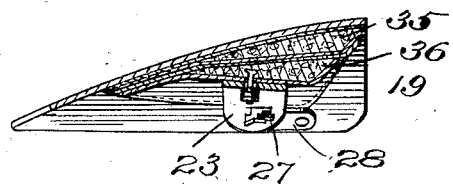
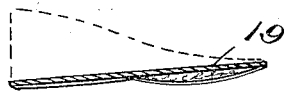
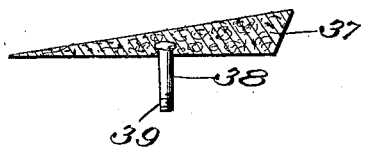
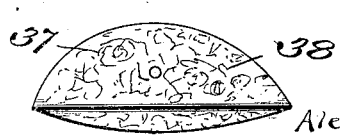

UNITED STATES PATENT OFFICE.

ALEXANDER E. BLOCK, OF ST. LOUIS, MISSOURI.

ARCH-SUPPORT.

1,110,476.   Specification of Letters Patent.   Patented Sept. 15, 1914.

Application filed December 14, 1911. Serial No. 665,857.

*To all whom it may concern:*

Be it known that I, ALEXANDER E. BLOCK, a citizen of the United States, and a resident of St. Louis, Missouri, have invented certain new and useful Improvements in Arch-Supports, of which the following is a specification.

My invention relates to improvements in arch supports and has for its object to provide an arch support having various adjustments as to thickness and curvature, to permit it to conform to the contour of the foot of the wearer in the various conditions of the foot occasioned by internal or external injury.

Figure 2:
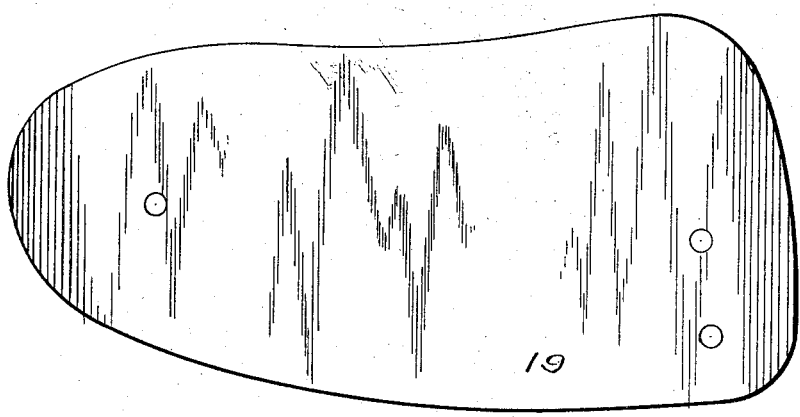
Figure 3:
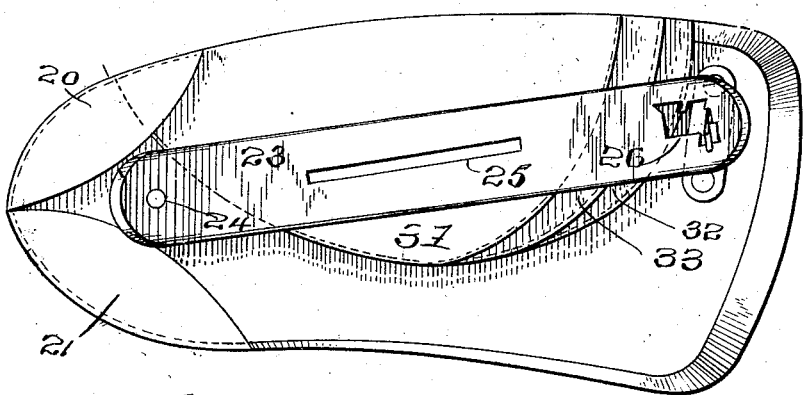
Figure 16:
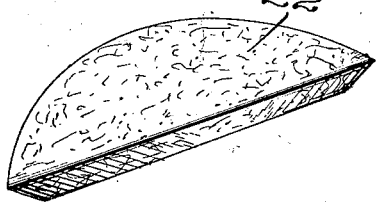
Figure 4:
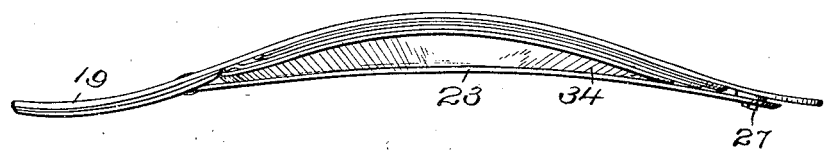
Figure 5:
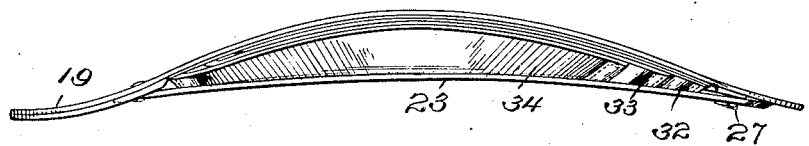
Figure 6:
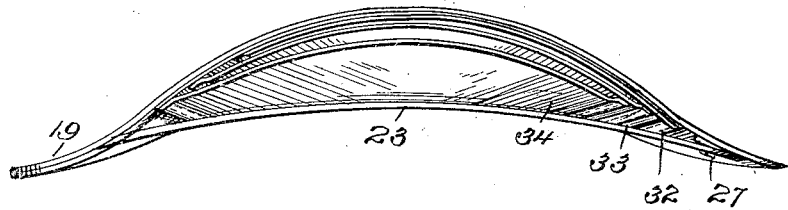
Figure 7:
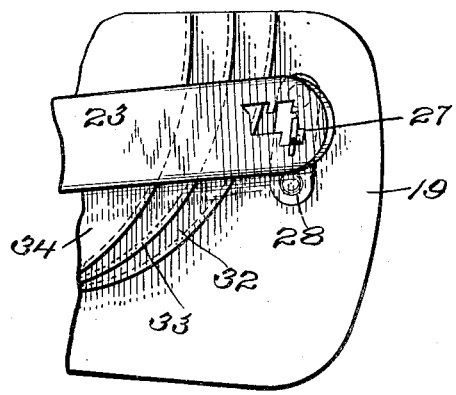
Figure 8:
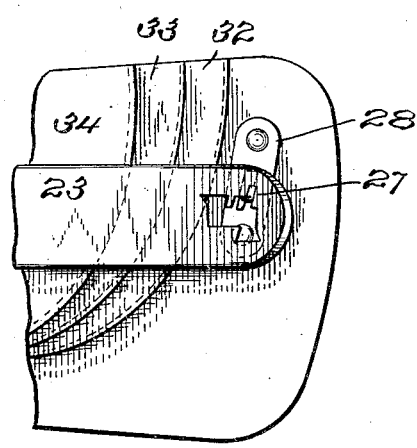
Figure 9:
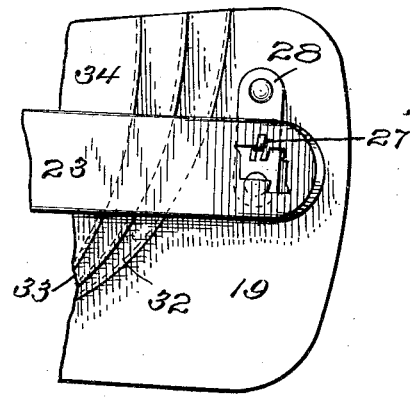
Figure 18:
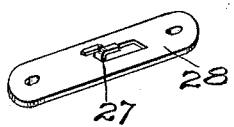

In the drawings Figure 1 is a perspective view of a shoe, a portion of its side being broken away, showing the arch support of my invention in place. Fig. 2 is a top plan view of the arch support of my invention. Fig. 3 is a bottom plan view of the same. Fig. 4 is a side elevation of the arch support. Figs. 5 and 6 are similar views showing other adjustments of the arch support. Fig. 7 is a fragmental bottom plan view of the arch support showing one adjustment of the tension-bar. Figs. 8 and 9 are similar views showing other adjustments of the tension-bar. Fig. 10 is a sectional view of the front end of the arch support showing the adjustment of the tension-bar upon its lock. Fig. 11 is a similar view showing the locking pin by which the lower insert is secured in place. Fig. 12 is a side elevation of the rear end of the arch support showing one of the heel-inserts in place. Fig. 13 is a sectional transverse view of the lower insert showing the locking pin in place. Fig. 14 is a transverse sectional view of one of the inserts. Fig. 15 is a bottom plan view of the insert illustrated in Fig. 13. Fig. 16 is a perspective view of one of the heel inserts. Fig. 17 is a bottom plan view of the tension-bar. Fig. 18 is a perspective view of the lock employed in holding the tension-bar in place.

As shown in the drawings the arch support of my invention consists of a flexible main body section 19 provided with a right heel pocket 20 and a left heel pocket 21. A heel-insert 22 is adapted to be seated in either of the pockets 20 or 21, to sustain the heel of the wearer, such insertion being especially adapted to cases where the heel of the shoe of the user, is normally run over, as well as cases where the arch of the user requires abnormally high support. Between the heel pockets 20 and 21 the tension-bar 23 is longitudinally mounted through the body section 19 by means of the pin 24; the bar 23 being provided with a longitudinal slot 25, and at its front end with the perforation 26, which is adapted to receive the hooked projection 27 of the lock 28; the opening 26 being provided with slotted recesses 29, 30 and 31, providing three several adjustments. The purpose of these adjustments is to regulate the curvature of the flexible body-section 19, with reference to the number of inserts (hereinafter described) which are interposed between the flexible body-section 19 and the bar 23.

Upon the lower face of the body-section 19 three superimposed side pockets are formed by means of the curved strips 32, 33 and 34, which are superimposed upon the body section 19 and upon each other as illustrated in Figs. 3, 4, 5, 6, 7, 8, 9, 10 and 11. In the pockets so formed, inserts 35—36 are placed, which inserts are of any desired thickness. The number and contour of the inserts will be governed by the condition of the foot of the wearer. In the pocket formed between the sheets or strips 33 and 34, that being the lowest pocket, the secondary insert 37 may be used, which is provided with a depending pin 38, whose lower end is screw-threaded as indicated by the numeral 39. The pin 38 is adapted to be passed through the sheet 34 and through the slot 25 and to be secured in place by a nut 40, contacting with the lower face of the tension-bar 23. The function of the tension bar, therefore, is to hold the insert 37 rigidly in position, as well as to control the curvature of the main body section 19.

By means of the various described elements the arch support of my invention can be made to conform to a wide range of departure from the normal contour of the foot, and may by successive adjustments be made to conform to that contour during the successful treatment of the foot, during the progress of which the swelling incident to many derangements of the foot is reduced. The material employed may be any preferred fabric, having the desired degree of flexibility and stiffness to make the arch support retain its shape when built up by the inserts to conform with the condition of the foot of the user. The material of the inserts may be various, being preferably light in weight and impervious to moisture.

These adjustments are possible because the heel inserts 22 may be used in either or both of the pockets 20 and 21, or may be omitted altogether; the secondary insert 37 may be used or omitted at will; and in addition thereto the inserts 35 and 36 may be used singly or together or omitted altogether. Thus the device of my invention is given an extremely large range of adjustability for the treatment of a great variety of disorders of the human foot.

Having thus described my invention what I claim as new and desire to have secured to me by the grant of Letters Patent of the United States is—

1. In an arch support, the combination of a flexible body member; a series of superimposed and overlapping pockets formed on the lower face of the body-member; a tension-bar pivotally secured at one of its ends to the lower face of the body member and extending longitudinally beneath said pockets, means for adjustably locking the free end of said tension-bar at a point upon the lower face of the body member, and an insert slidably secured to and mounted upon said tension-bar.

2. In an arch support, the combination of a flexible body member provided with heel pockets and superimposed and overlapping side pockets; one or more inserts removably seated in said pockets; a tension-bar extending longitudinally beneath said side pockets; means for adjustably securing the tension-bar to the lower face of the body member, and an insert slidably secured to and mounted upon said tension-bar.

3. In an arch support, the combination of a flexible body member provided with a pocket upon its lower face; an insert adapted to be removably seated in said pocket; a tension-bar adjustably secured to the lower face of the body member and provided with an elongated opening; a secondary insert adapted to fit between the tension-bar and the lower face of said pocket; a pin mounted in said secondary insert; and means for securing said pin in place within said elongated opening.

4. In an arch support, a flexible body member; a tension-bar provided with an elongated opening and mounted upon the lower face of the body member; an insert adapted to be seated between the body member and the tension-bar; and a pin fixed in said insert and extending through said elongated opening to secure the insert to the tension-bar.

In testimony whereof, I have signed my name to this specification, in presence of two subscribing witnesses.

ALEXANDER E. BLOCK.

Witnesses:
J. R. FRAME,
N. E. BROCKMAN.

---

Copies of this patent may be obtained for five cents each, by addressing the "Commissioner of Patents, Washington, D. C."